United States Patent [19]

Bissell

[11] 4,161,888
[45] Jul. 24, 1979

[54] PRESSURE GAUGE CONSTRUCTION

[75] Inventor: Robert D. Bissell, Orange, Conn.

[73] Assignee: Dresser Industries, Inc., Dallas, Tex.

[21] Appl. No.: 908,482

[22] Filed: May 22, 1978

[51] Int. Cl.$^2$ .............................................. G01L 19/02
[52] U.S. Cl. ........................................ 73/740; 73/741
[58] Field of Search ................ 73/740, 743, 742, 741, 73/756, 368.6

[56] References Cited

U.S. PATENT DOCUMENTS

| 1,164,573 | 12/1915 | Bristol et al. | 73/740 |
| 3,688,586 | 9/1972 | Koch | 73/743 |
| 3,952,598 | 4/1976 | Ferguson et al. | 73/740 |

Primary Examiner—Donald O. Woodiel
Attorney, Agent, or Firm—Daniel Rubin

[57] ABSTRACT

Pointer zero adjustment in a pressure gauge is effected by means of a shaft (50) centrally extending laterally inward of the casing from a supportive centering flange (40) on the inside face of the crystal (10). A Bourdon tube (44) is radially coiled concealed from view through the crystal (10) about a pressure sealed rear portion of the shaft (50) to which it is rotationally secured. The pointer unit (42) is of a more or less U-shaped cross section with a tubular center (48) loosely supported on the shaft (50) juxtaposed to the crystal (10). The front pointer formation (42) simulates a conventional pointer appearance while its rear formation (52) is rotatably linked to the free end (56) of the Bourdon tube for incurring operational displacement therewith. On removing a detachable cover (37) from over an aperture (34) in the crystal coincidingly located opposite the shaft end thereat, access is provided for an external tool (78) to operationally engage a tool receiving hex socket (38) in the shaft end. Arcuately displacing the shaft (50) via the tool (78) calibrationally positions the pointer (42). By crystal (10) being of composition and thickness affording a spring rate of matched correlation to maximum anticipated inlet pressure, the crystal provides a secondary function for relieving overpressure.

8 Claims, 5 Drawing Figures

PRESSURE GAUGE CONSTRUCTION

TECHNICAL FIELD

The field of art to which the invention pertains comprises the art of measuring and testing as related to fluid pressure gauges.

BACKGROUND OF THE INVENTION

Pressure gauges enjoy very extensive commercial and industrial use and are consequently regarded as high production items. Because of such wide use, they are supplied by a plurality of manufacturers and sold in very price conscious competition. Each manufacturer instinctively strives to reduce product costs by improvements, however marginal, which reduce labor and/or materials that can contribute to cost savings in the end product.

Commonly affording pressure sensitivity in the pressure gauge is a Bourdon tube of a pressure-tight construction having a free end displaceably movable in a well known and predictable manner in response to pressure changes supplied at its inlet. To translate tube movement into values of pressure, a pointer is displaceably driven by its free end opposite a calibrated dial plate. For ensuring readout accuracy, provision is usually made for calibrating the pointer to the zero position of the dial.

In most conventional gauge constructions, the inlet end of the Bourdon tube is secured to a stem connection extending outward of the casing either rear or bottom. In the back connected version the dial plate can be rotatably positioned in the course of assembly relative to the socket to effect the zero adjustment without detrimentally affecting the assembly. This is not possible, however, in the lower or bottom connected design since the dial plate aligns with the socket and cannot be adjusted. It has also been known to rotate the coil/pointer/crystal as a unit in effecting the zero calibration by use of a crystal construction as disclosed, for example, in U.S. Pat. No. 3,952,598. The latter has been found particularly suitable and economically advantageous as a manufacturing adjustment for a relatively small diameter fire extinguisher type gauge in which the pointer is directly supported on the free end of the coiled Bourdon tube. Such constructions, however, do not permit post-assembly calibration. Moreover, they generally expose the Bourdon tube and appearance-wise are marketably unsuitable for larger diameter, conventional type gauges in which only the pointer is usually visible through the crystal while the Bourdon tube and movement, if any, are concealed. It has therefore not been known how to construct a zero adjustment on such gauges capable of utilization either during or post-assembly while being equally suited for either a lower or back connected socket construction. Despite recognition of the problem, a ready solution has not heretofore been known.

SUMMARY OF THE INVENTION

This invention relates to a pressure gauge construction and more specifically to a coil/pointer unit type zero adjustment affording an otherwise conventional appearance for a gauge construction while being equally suited for either back or lower connected stem versions. This is achieved in accordance herewith by use of a central shaft which extends laterally inward of the casing from a supportive centering flange on the inside face of the crystal. An internal hex formation in the shaft end is accessible through a normally covered aperture in the crystal. The other end of the shaft terminates behind the dial face and supports a coiled Bourdon tube rotationally secured thereto. A more or less U-shaped pointer unit is supported on the shaft via a bored center rotationally free thereof. The unit includes a front leg simulating a pointer that is positioned on the shaft forward of the dial face while the remainder is positioned behind the dial face operationally connected with the free end of the Bourdon tube. Inserting a tool through the crystal aperture enables arcuate displacement of the shaft which in turn zero adjusts the pointer. After zero calibration has been completed, the crystal aperture can optionally be closed by whatever cover unit is being employed. Since the dial face per se is not displaced, the adjustment feature is equally suited for either lower or back connected stem constructions. At the same time the gauge outwardly has a conventional gauge appearance while utilizing the economically viable coil/pointer zero adjustment feature which has proven more economical than prior art constructions utilized for those purposes.

It is therefore an object of the invention to provide a novel coil/pointer zero position setting apparatus for a pressure gauge.

It is a further object of the invention to effect the previous object in an efficient and economical manner with a construction equally suited for either a lower or back connected gauge version.

BRIEF DESCRIPTION OF THE DRAWINGS

Referring now to FIGS. 1, 2, 4 and 5 of the drawings, the gauge construction in accordance herewith comprises a transparent plastic crystal 10 of clear polycarbonate which attaches via a snap connection 12 to a molded plastic back unit 14 to form a casing. Connection 12 also retains crystal 10 against blowout as will be described. Integrally part of back unit 14 is a lower extending stem 16 which is threaded at 18 for system mounting and defines an inlet passage 20 through which to receive system pressure "P" to be measured. A dial plate 22 containing inscribed graduations of pressure values 24 is secured seated between an annular flange 26 of the backing unit and an annular shoulder 28 of the crystal. In this position the dial plate serves to divide the internal casing cavity between a front portion 30 visibly exposed through the crystal and a rear portion 32 generally concealed from view. Values of pressure are indicated by a pointer 42 to be described that is operationally displaced by pressure induced deflections of a Bourdon tube 44.

Figure 1:
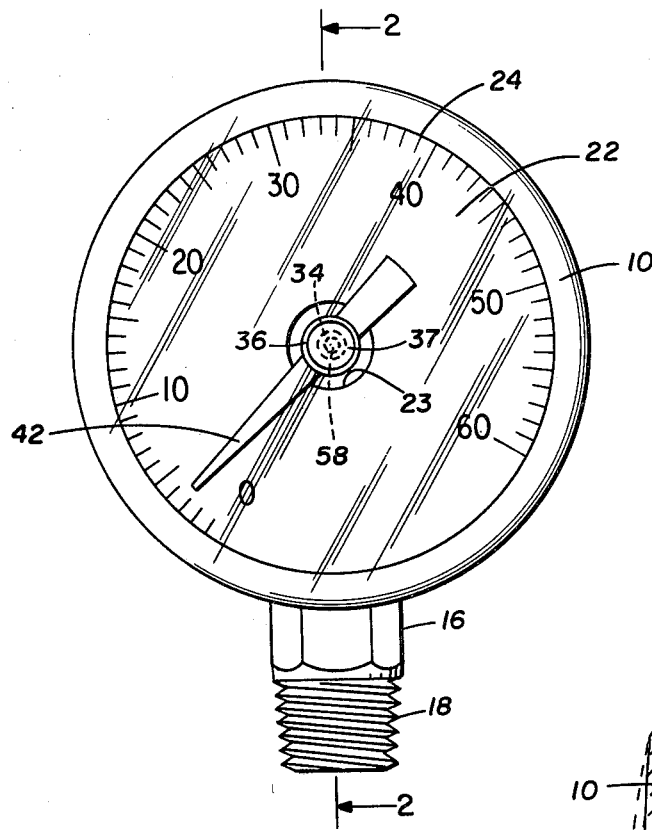
FIG. 1 is a front elevation of a pressure gauge construction in accordance herewith.

For effecting zero calibration settings in accordance herewith, crystal 10 includes a small diameter centrally located aperture 34 extending between an external recess 36 and an internal counterbore 38. Normally, a detachable plug or tape 37 is contained in recess 36 to maintain the interior dust-tight except when access thereto is required. A circular boss 40 surrounds the counterbore 38 and provides support for end 51 of an essentially stationary shaft 50 that includes a female wrench hex socket 58. Shaft 50 extends transversely through an aperture 23 in dial plate 22 and behind the dial plate merges with an integral larger diameter tubular sleeve 60 terminating at an end 72. End 72 is adapted to be received in back unit cup flange 68 having a bore 70 that via recess 66 communicates with laterally extending inlet passage 20. Sleeve 60 is radially surrounded by the flat, spiral wound coiled portion of Bourdon tube 44 and includes an axial slot 62 embracing the coil before it incurs a right angle bend as disclosed, for example, in U.S. Pat. No. 3,952,598. Beyond the bend within sleeve 60, the Bourdon tube converts to a tubular cross section extending to its inlet end 64 received in recess 66 which is in open communication with inlet passage 20. When assembled in the manner illustrated, the face of sleeve end 72 engages a metal washer 74 to in turn compress an O-ring gasket 76 for effecting a pressure-tight seal thereabout.

Pointer 42 for purposes hereof is radially connected and preferably integrally molded of metal or plastic to a tubular sleeve 46 supported for rotation via a through bore 48 about shaft 50. Longitudinally with shaft 50, sleeve 46 extends axially through dial plate aperture 23 and at its opposite end includes an integral or attached radial arm 52 containing a radial slot 54. Laterally received in the slot operationally linking pointer 42 to Bourdon tube 44 is a lateral pin 56 secured to the free end of the Bourdon tube. For that purpose, slot 54 is of a length sized to permit unrestrained displacement of the coil in the course of normal expansion and contraction.

Figure 3:
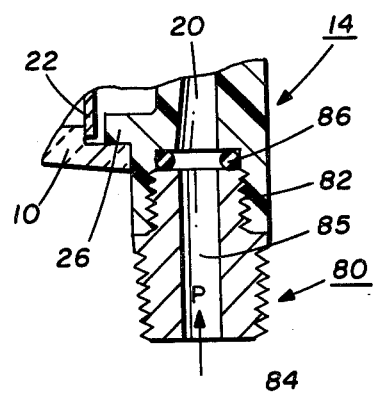
FIG. 3 is a fragmentary alternative socket construction to that shown in FIG. 2.
Figure 2:
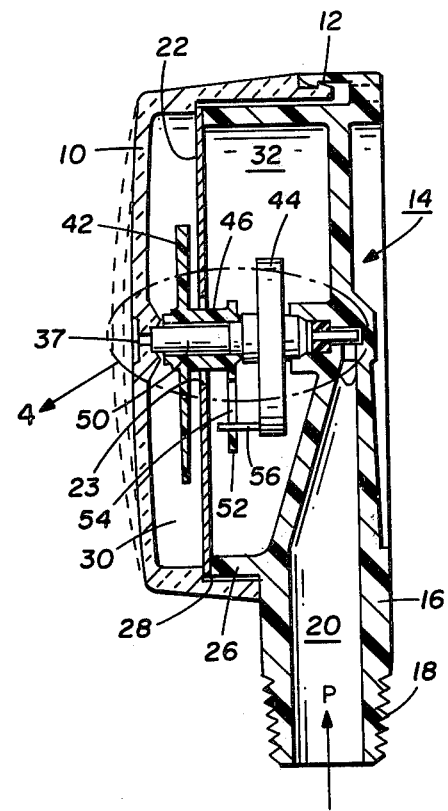
FIG. 2 is a sectional view taken substantially along the lines 2—2 of FIG. 1.

In the alternative stem construction of FIG. 3, the integral stem 16 is replaced with a two-component stem 80 affording a metal connector 84 when required by a customer. For this purpose plastic stem 16 is shortened and includes a threaded counterbore at 82 to receive a metal threaded insert 84 having a thru-bore 85. When assembled in the manner shown, O-ring gasket 86 is compressed to provide a pressure-tight seal thereat.

Figure 4:
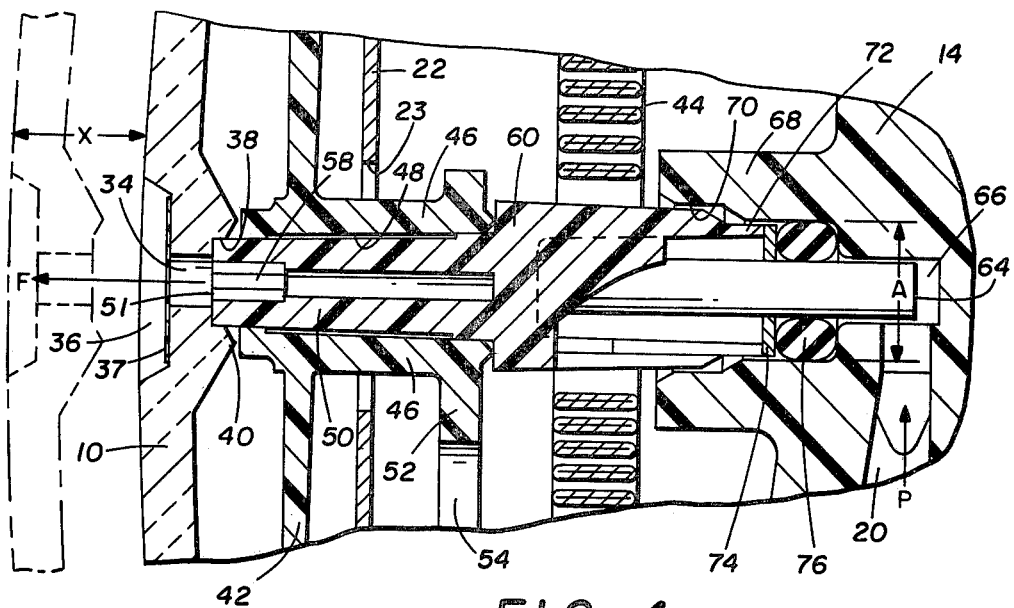
FIG. 4 is a fragmentary enlargement of the boxed outline 4 of FIG. 2.

In a preferred embodiment, crystal 10 is constructed so as to accommodate excess pressure imposed by inlet pressure "P" against O-ring gasket 76 by deflecting outward to the relation shown dashed in FIG. 4. The value of excess pressure to be provided for is usually at about one-half the burst pressure of the Bourdon tube coil 44 and is effected by a crystal deflection distance "X" sufficient to displace O-ring seal 76 inward of the casing cavity until leakage past the seal into the cavity is achieved. Snap connection 12 must be sufficiently effective during periods of crystal deflection to retain crystal 10 against blowout.

For utilizing crystal 10 in this manner, the deflection distance "X" as will enable O-ring seal 76 to be dislodged sufficiently to permit leakage of a pressure "P" will vary with the spring rate "K" of the crystal and the face area "A" of seal 76. The spring rate "K" can then be determined by the following relationship:

$$K = PA/X$$

For an "X" of about 0.030 inches, an "A" of about 0.030 square inches and an intended relief pressure of about 1000 p.s.i. the required spring rate "K" is about 1000 lbs/inch. This can then be provided for with an appropriate thickness "t" correlated to the properties of the crystal material.

Figure 5:
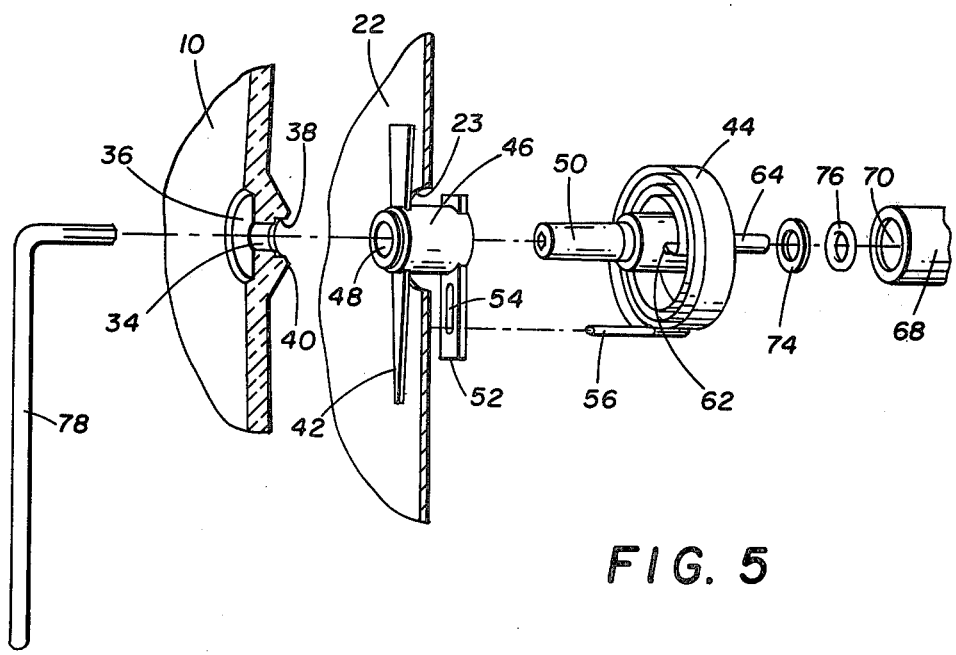
FIG. 5 is an exploded isometric view of the zero adjustment components of the previous figures.

In operation zero setting in accordance herewith is effected by detaching tape or cover 37 as to render the tool receiving hex formation 58 externally accessible through crystal aperture 34. A hex wrench 78 (FIG. 5) is then placed through aperture 34 into shaft socket 58 for rotating shaft 50. Rotating shaft 50 in this manner has the effect of rotating Bourdon tube 44 which through pin connection 56 and arm 54 effects a corresponding rotation of the pointer 42. In this manner, on-site and in-service zero calibration can be readily made whenever required by the consumer without any disassembly of the instrument and without regard to whether the gauge includes a back or bottom stem connection. Moreover, by appropriately matching the crystal spring rate properties with a contemplated value of overpressure in a system supply to the gauge, the crystal can afford pressure relief in the form of crystal deflection.

By the above description there has been disclosed a novel construction for a pressure gauge which appearancewise closely simulates accepted marketing standards for such gauges while at the same time readily affording a coil/pointer zero adjustment capable of ready in-service setting equally suited for either lower or back connected stem constructions. Since essentially all operating components when assembled as above other than pointer 42 are contained in rear cavity 32, the entire gauge construction simulates a conventional appearance for gauges of this type. That is, with pointer 42 being the only visible component by virtue of its intervening relation between crystal 10 and dial plate 22, the operating mechanism in rear portion 32 remains essentially concealed from view through the crystal. These results are therefore achieved by a relatively simple arrangement of components of comparably less construction cost than conventional gauges yet affording all the virtues thereof. Consequently, such gauges can be manufactured at considerably less cost than similar purpose gauges of the prior art as to afford substantial marketing advantage thereover in meeting a long-time objective of the industry.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a pressure gauge including a hollow casing at least partially defined by a transparent viewing crystal visibly exposing both a dial plate and a pointer displaceable relative to graduations on said dial plate for indicating values of pressure and a Bourdon tube having a fixed end adapted to communicate outward of said casing with a pressure source of value to be measured and a free end operably connected to said pointer for displacing said pointer in response to pressure changes received at said fixed end, zero adjustment calibration apparatus comprising in combination:

(a) an arcuately displaceable shaft interior of said casing and rotatably engaged with said Bourdon tube at a location near the fixed end thereof, said shaft being adapted when arcuately displaced to effect concomitant arcuate displacement of said Bourdon tube and pointer connected thereto;

(b) engagement means on said shaft comprising a tool engageable formation on the end of said shaft operable to effect arcuate displacement thereof; and (c) an aperture through said casing located opposite said shaft end engagement means to render said tool engageable formation operably accessible from the exterior of said casing for calibrationally positioning said pointer.

2. In a pressure gauge according to claim 1 in which said shaft extends in a direction substantially lateral to the inside face of said viewing crystal and said aperture extends through said viewing crystal.

3. In a pressure gauge according to claim 2 in which said crystal includes a recess defined on its inside face opposite said aperture and the shaft end thereat is positioned seated in said recess.

4. In a pressure gauge according to claim 3 in which the opposite shaft end is positioned seated in sealed relation against a back member of said casing in effectively exposed communication with pressure changes received at the fixed end of said Bourdon tube and said crystal is characterized by spring rate properties matched to accommodate a controlled longitudinal offset of said shaft for leakage to occur thereabout in response to a predetermined value of overpressure being received from the pressure source.

5. In a pressure gauge according to claim 3 including a tubular sleeve supported on said shaft rotatably displaceable thereabout and connecting said pointer with the free end of said Bourdon tube operably intervening in the connection therebetween.

6. In a pressure gauge according to claims 1, 2, 3, 4 or 5 in which said dial plate substantially divides the interior of said casing between a front portion extending between the front face of said dial plate and the inner surface of said crystal and a rear portion extending between the back face of said dial plate and a back member of said casing, said dial plate includes an aperture through which said shaft extends between said front and rear portions, and said pointer is located in the front portion of said casing visible through said crystal while said Bourdon tube is located in the rear portion of said casing substantially concealed from view through said crystal.

7. In a pressure gauge according to claim 6 in which said casing includes a bottom stem connection.

8. In a pressure gauge according to claim 6 in which said casing is substantially of all plastic composition.

* * * * *